United States Patent
Takuno et al.

(10) Patent No.: US 10,309,521 B2
(45) Date of Patent: Jun. 4, 2019

(54) DRIVING-FORCE DISTRIBUTION DEVICE

(71) Applicant: JTEKT CORPORATION, Osaka-shi (JP)

(72) Inventors: Hiroshi Takuno, Nukata-gun (JP); Noriyuki Fujii, Hekinan (JP); Yutaka Murakoshi, Shizuoka (JP); Yohei Fujii, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 110 days.

(21) Appl. No.: 15/382,158

(22) Filed: Dec. 16, 2016

(65) Prior Publication Data

US 2017/0175873 A1    Jun. 22, 2017

(30) Foreign Application Priority Data

Dec. 22, 2015   (JP) ................. 2015-249933

(51) Int. Cl.
  *F16H 48/22*   (2006.01)
  *F16H 57/04*   (2010.01)
  (Continued)

(52) U.S. Cl.
  CPC ....... *F16H 57/0428* (2013.01); *B60K 17/344* (2013.01); *B60K 23/08* (2013.01);
  (Continued)

(58) Field of Classification Search
  CPC .. F16H 57/0428; F16H 48/22; F16H 57/0483; F16H 57/043; F16H 48/08; B60K 23/08; B60K 17/344; B60K 17/346
  (Continued)

(56) References Cited

U.S. PATENT DOCUMENTS 7,976,421 B2 *  7/2011  Nakajima ............... F16H 48/08
                                                   475/160
9,791,031 B2 * 10/2017  Fox ........................ F16H 48/08
                      (Continued)

FOREIGN PATENT DOCUMENTS

CA    2281242 A1 *  3/2000  ......... F16H 57/0421
EP    2243653 A2 * 10/2010  ............. B60K 23/08
                      (Continued)

*Primary Examiner* — Roger L Pang
(74) *Attorney, Agent, or Firm* — Oblon, McClelland, Maier & Neustadt, L.L.P.

(57) ABSTRACT

A driving-force distribution device is provided that can supply lubricant to an above-positioned pinion gear among a pair of pinion gears even when rotation of a differential case of a differential mechanism stops in a two-wheel-drive mode of a four-wheel-drive vehicle. A driving-force distribution device mounted on a four-wheel-drive vehicle includes a differential mechanism and a clutch mechanism. The differential mechanism includes a differential case, a pinion shaft, a pair of pinion gears, and a pair of side gears. In the pinion shaft, a flow passage is formed through which a lubricant is allowed to flow from the below-positioned pinion gear among the pair of pinion gears toward the above-positioned pinion gear in the two-wheel-drive mode in which the pair of pinion gears rotate in opposite directions with the differential case not rotating. The lubricant is supplied to the flow passage by rotation of the below-positioned pinion gear.

9 Claims, 7 Drawing Sheets

(FIRST EMBODIMENT)

(51) Int. Cl.
  *B60K 17/344* (2006.01)
  *B60K 23/08* (2006.01)
  *F16H 48/08* (2006.01)
  *B60K 17/346* (2006.01)
  *F16H 48/32* (2012.01)

(52) U.S. Cl.
  CPC ......... *B60K 23/0808* (2013.01); *F16H 48/22* (2013.01); *F16H 57/043* (2013.01); *F16H 57/0483* (2013.01); *B60K 17/346* (2013.01); *B60K 2023/0833* (2013.01); *B60K 2023/0866* (2013.01); *B60Y 2400/421* (2013.01); *B60Y 2400/424* (2013.01); *F16H 48/08* (2013.01); *F16H 48/32* (2013.01)

(58) Field of Classification Search
  USPC ........................................ 475/160, 221, 231
  See application file for complete search history.

(56) References Cited

U.S. PATENT DOCUMENTS

2013/0274055 A1\* 10/2013 Horaguchi ......... B60K 17/3515
                                                                              475/221
2015/0192198 A1     7/2015 Suzuki

FOREIGN PATENT DOCUMENTS

| JP | 2000297856 A | \* 10/2000 | ......... F16H 57/0483 |
|---|---|---|---|
| JP | 2003207022 A | \* 7/2003 | ........... F16H 57/043 |
| JP | 2015-129534 | 7/2015 | |

\* cited by examiner

FIG.2 (FIRST EMBODIMENT)

(FIRST EMBODIMENT)

(FIRST EMBODIMENT)

(FIRST EMBODIMENT)

(SECOND EMBODIMENT)

(SECOND EMBODIMENT)

(THIRD EMBODIMENT)

(THIRD EMBODIMENT)

(FOURTH EMBODIMENT)

(FOURTH EMBODIMENT)

DRIVING-FORCE DISTRIBUTION DEVICE

INCORPORATION BY REFERENCE

The disclosure of Japanese Patent Application No. 2015-249933 filed on Dec. 22, 2015 including the specification, drawings and abstract, is incorporated herein by reference in its entirety.

BACKGROUND OF THE INVENTION

1. Field of the Invention

The present invention relates to a driving-force distribution device that is mounted on a four-wheel-drive vehicle having a pair of right and left main drive wheels and a pair of right and left auxiliary drive wheels to distribute driving force of a driving source to the pair of right and left auxiliary drive wheels.

2. Description of the Related Art

As a conventional driving-force distribution device that is mounted on a four-wheel-drive vehicle having a pair of right and left main drive wheels and a pair of right and left auxiliary drive wheels to distribute driving force of a driving source to the pair of right and left auxiliary drive wheels, a driving-force distribution device described in Japanese Patent Application Publication No. 2015-129534 (JP 2015-129534 A) is known.

The driving-force distribution device described in JP 2015-129534 A includes: a differential mechanism that distributes driving force of a driving source transmitted via a propeller shaft to a pair of right and left auxiliary drive wheels in a manner to allow differential motion therebetween; and a clutch mechanism that is disposed between one auxiliary drive wheel among the pair of right and left auxiliary drive wheels and the differential mechanism and can adjust the driving force transmitted from the differential mechanism to the one auxiliary drive wheel. When this four-wheel-drive vehicle travels in a two-wheel-drive state, coupling between the propeller shaft and the driving source is disconnected and the clutch mechanism is released, which stops rotation of the propeller shaft and a differential case of the differential mechanism. In this case, a pair of pinion gears of the differential mechanism is supported via a pinion shaft supported by the differential case to rotate in opposite directions.

In the four-wheel-drive vehicle including the driving-force distribution device configured as described above, during traveling in the two-wheel-drive state, rotation of the propeller shaft and the differential case stops. Consequently, travel resistance due to rotational resistance associated with the rotation thereof decreases and fuel efficiency is improved.

In the driving-force distribution device described in JP 2015-129534 A, rotation of the pinion gears of the differential mechanism is lubricated with lubricant in the differential case. However, because rotation of the differential case stops during traveling in the two-wheel-drive state, the lubricant is not supplied to one of the pinion gears that is positioned above the rotation axis of the differential case when the angle of the pinion shaft in this stop state is nearly perpendicular to the horizontal direction. If this state continues for a long period of time, wear of the pinion gear may be accelerated due to lack of lubrication.

In order to prevent such lack of lubrication of the pinion gear, the clutch mechanism may be operated, for example, at predetermined time intervals so that the differential case and the propeller shaft can be rotated by rotational force of the auxiliary drive wheels. However, in this case, when the differential case and the propeller shaft start rotating, shock or vibration may occur and effect of improving the fuel efficiency may be limited.

SUMMARY OF THE INVENTION

It is one object of the present invention to provide a driving-force distribution device that can supply lubricant to a pinion gear positioned above the rotation axis of a differential case of a differential mechanism on the side of auxiliary drive wheels even when rotation of the differential case stops in a two-wheel-drive mode of a four-wheel-drive vehicle.

A driving-force distribution device according to one aspect of the present invention is a driving-force distribution device mounted on a four-wheel-drive vehicle that includes, among a pair of front wheels and a pair of rear wheels, one pair as a pair of right and left main drive wheels and the other pair as a pair of right and left auxiliary drive wheels to which driving force is transmitted via a propeller shaft, and is capable of switching between a two-wheel-drive state and a four-wheel-drive state by a first engagement/disengagement mechanism capable of cutting off transmission of the driving force from a driving source to the propeller shaft. The driving-force distribution device includes: a differential mechanism that distributes the driving force of the driving source transmitted via the propeller shaft in the four-wheel-drive state to the pair of right and left auxiliary drive wheels in a manner to allow differential motion between the right and left auxiliary drive wheels; and a second engagement/disengagement mechanism that is disposed between either one auxiliary drive wheel among the pair of right and left auxiliary drive wheels and the differential mechanism, and is capable of cutting off transmission of the driving force from the differential mechanism to the one auxiliary drive wheel. The differential mechanism includes: a differential case that is coupled to the propeller shaft via a gear mechanism; a pinion shaft that is supported by the differential case to rotate integrally with the differential case; a plurality of pinion gears that are supported via the pinion shaft; and a pair of side gears that mesh with the pinion gears such that gear axes of the pair of side gears extend orthogonally to those of the pinion gears, and meshing between the pinion gears and the pair of side gears is lubricated with lubricant. The pinion shaft has a flow passage through which the lubricant is allowed to flow from a side of one pinion gear positioned below among the pinion gears to a side of another pinion gear in a two-wheel-drive mode in which the pair of side gears rotate in opposite directions with the differential case not rotating. The lubricant is supplied to the flow passage by rotation of the one pinion gear positioned below.

The driving-force distribution device according to the present invention enables the lubricant to be supplied from the side of the pinion gear positioned below to the side of the pinion gear positioned above among the pinion gears even when rotation of the differential case of the differential mechanism on the side of the auxiliary drive wheels stops in the two-wheel-drive mode of the four-wheel-drive vehicle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention will be described with reference to FIG. 1 to FIG. 5.

Figure 1:
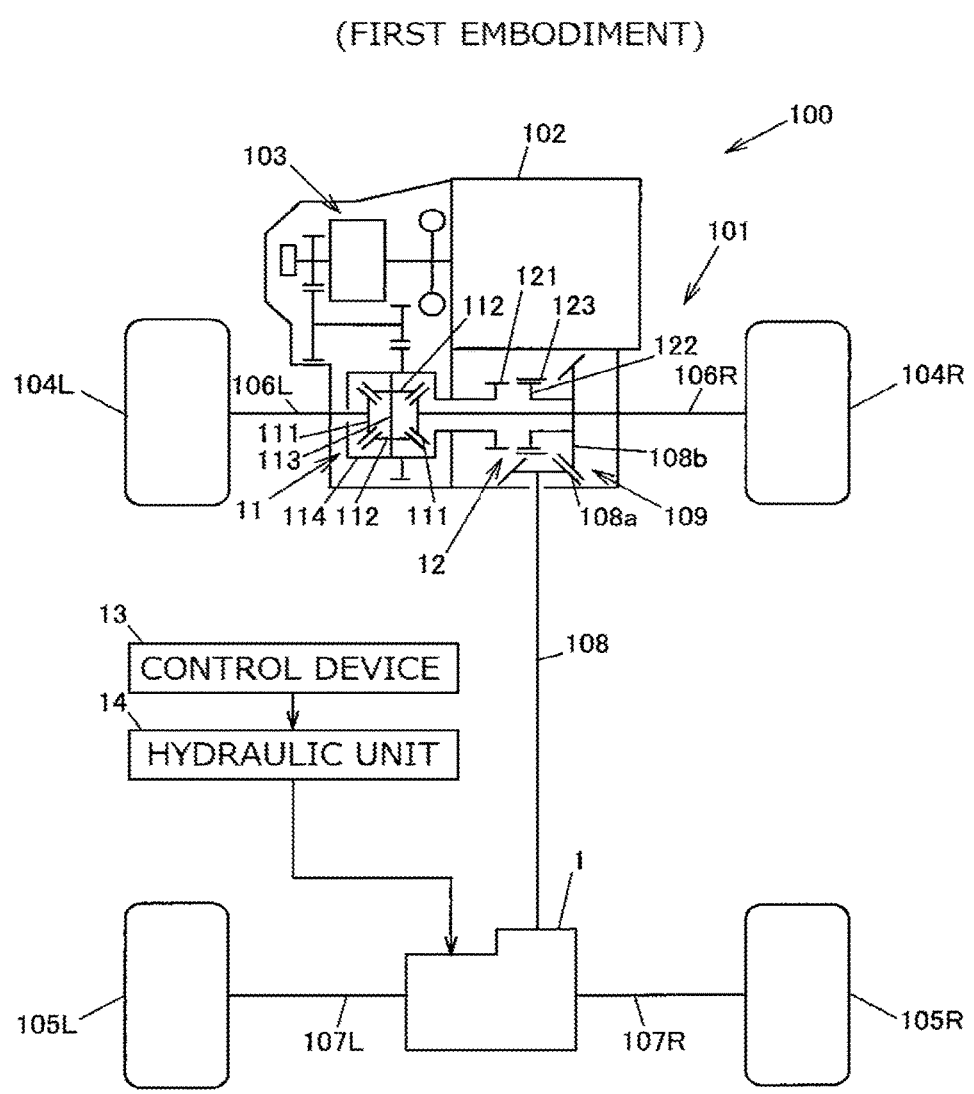
FIG. 1 is an overall structure diagram of a four-wheel-drive vehicle on which a driving-force distribution device according to a first embodiment is mounted.

FIG. 1 is an overall structure diagram illustrating a configuration example of a four-wheel-drive vehicle on which a driving-force distribution device according to the first embodiment of the present invention is mounted.

A four-wheel-drive vehicle 100 includes an engine 102 as a driving source that generates driving force for traveling, a transmission 103, front wheels 104R and 104L as a pair of right and left main drive wheels, rear wheels 105R and 105L as a pair of right and left auxiliary drive wheels, a driving-force transmission system 101 that can transmit driving force of the engine 102 to the front wheels 104R and 104L and the rear wheels 105R and 105L, a control device 13, and a hydraulic unit 14. In the present embodiment, "R" and "L" in the numerals are respectively used to mean the right side and the left side with respect to the forward traveling direction of the vehicle.

This four-wheel-drive vehicle 100 can switch between a four-wheel-drive state in which driving force of the engine 102 is transmitted to the front wheels 104R and 104L and the rear wheels 105R and 105L and a two-wheel-drive state in which the driving force of the engine 102 is transmitted only to the front wheels 104R and 104L. In the present embodiment, a case in which an engine that is an internal-combustion engine is used as the driving source will be described, but the present invention is not limited to this. The driving source may include the engine and a high-power electric motor such as an Interior Permanent Magnet Synchronous (IPM) motor in combination, or the driving source may consist of such a high-power electric motor.

The driving-force transmission system 101 includes a front differential 11, a propeller shaft 108, a dog clutch 12 as a first engagement/disengagement mechanism capable of cutting off transmission of driving force from the engine 102 to the propeller shaft 108, a driving-force distribution device 1, front drive shafts 106R and 106L, and rear drive shafts 107R and 107L, and is configured to transmit driving force of the engine 102 to the front wheels 104R and 104L and the rear wheels 105R and 105L.

To the front wheels 104R and 104L, driving force of the engine 102 is constantly transmitted. To the rear wheels 105R and 105L, driving force of the engine 102 is transmitted via the dog clutch 12, the propeller shaft 108, and the driving-force distribution device 1. In other words, the four-wheel-drive vehicle 100 includes, among the front wheels 104R and 104L and the rear wheels 105R and 105L, one pair (front wheels 104R and 104L) as the pair of right and left main drive wheels and the other pair (rear wheels 105R and 105L) as the pair of right and left auxiliary drive wheels to which the driving force is transmitted via the propeller shaft 108.

The front differential 11 includes: a pair of side gears 111 and 111 coupled to the front drive shafts 106R and 106L in a pair; a pair of pinion gears 112 and 112 that mesh with the pair of side gears 111 and 111 such that the gear axes of the pinion gears extend orthogonally to those of the side gears; a pinion shaft 113 supporting the pair of pinion gears 112 and 112; and a front differential case 114 accommodating the pair of side gears 111 and 111, the pair of pinion gears 112 and 112, and the pinion shaft 113.

The dog clutch 12 includes: a first rotating member 121 that rotates integrally with the front differential case 114; a second rotating member 122 arranged parallel to the first rotating member 121 in the axial direction; and a cylindrical sleeve 123 that is disposed outside the first rotating member 121 and the second rotating member 122, and by which the first rotating member 121 and the second rotating member 122 can be coupled together so as not to be rotatable relative to each other.

Specifically, outer-peripheral spline fitting portions provided on the outer peripheral surfaces of the first rotating member 121 and the second rotating member 122 mesh with an inner-peripheral spline fitting portion provided on the inner peripheral surface of the sleeve 123, whereby the first rotating member 121 and the second rotating member 122 are coupled together by the sleeve 123 so as to integrally rotate. When the sleeve 123 is moved in the axial direction whereby the inner-peripheral spline fitting portion of the sleeve 123 meshes only with the outer-peripheral spline fitting portion of the second rotating member 122 and does not mesh with the outer-peripheral spline fitting portion of the first rotating member 121, the first rotating member 121 and the second rotating member 122 are decoupled and are rotatable relative to each other. The sleeve 123 can be moved forward and backward in the axial direction by an actuator (not depicted).

The propeller shaft 108 receives torque of the engine 102 from the front differential case 114 via the dog clutch 12, and transmits the torque to the driving-force distribution device 1. An end portion of the propeller shaft 108 on the front wheel side is provided with a pinion gear 108a meshing with a ring gear 108b that is coupled to the second rotating member 122 of the dog clutch 12 so as not to be rotatable relative thereto. The ring gear 108b and the pinion gear 108a are structured with hypoid gears, for example, to constitute a gear mechanism 109.

In the four-wheel-drive state of the four-wheel-drive vehicle 100, the dog clutch 12 is coupled, and driving force of the engine 102 is transmitted to the pair of right and left rear wheels 105R and 105L via the propeller shaft 108 and the driving-force distribution device 1. In the two-wheel-drive state, the dog clutch 12 is decoupled, and transmission of the driving force of the engine 102 to the propeller shaft 108 is cut off.

In the four-wheel-drive state, the driving-force distribution device 1 distributes the driving force input from the propeller shaft 108 to the pair of right and left rear wheels 105R and 105L in a manner to allow differential motion therebetween. The drive shaft 107L is coupled to the left rear wheel 105L, and the drive shaft 107R is coupled to the right rear wheel 105R.

The hydraulic unit 14 is controlled by the control device 13 to supply hydraulic fluid to the driving-force distribution device 1. The driving-force distribution device 1 is operated by the pressure of this hydraulic fluid to transmit driving force from the propeller shaft 108 to the rear drive shafts 107R and 107L.

Figure 2:
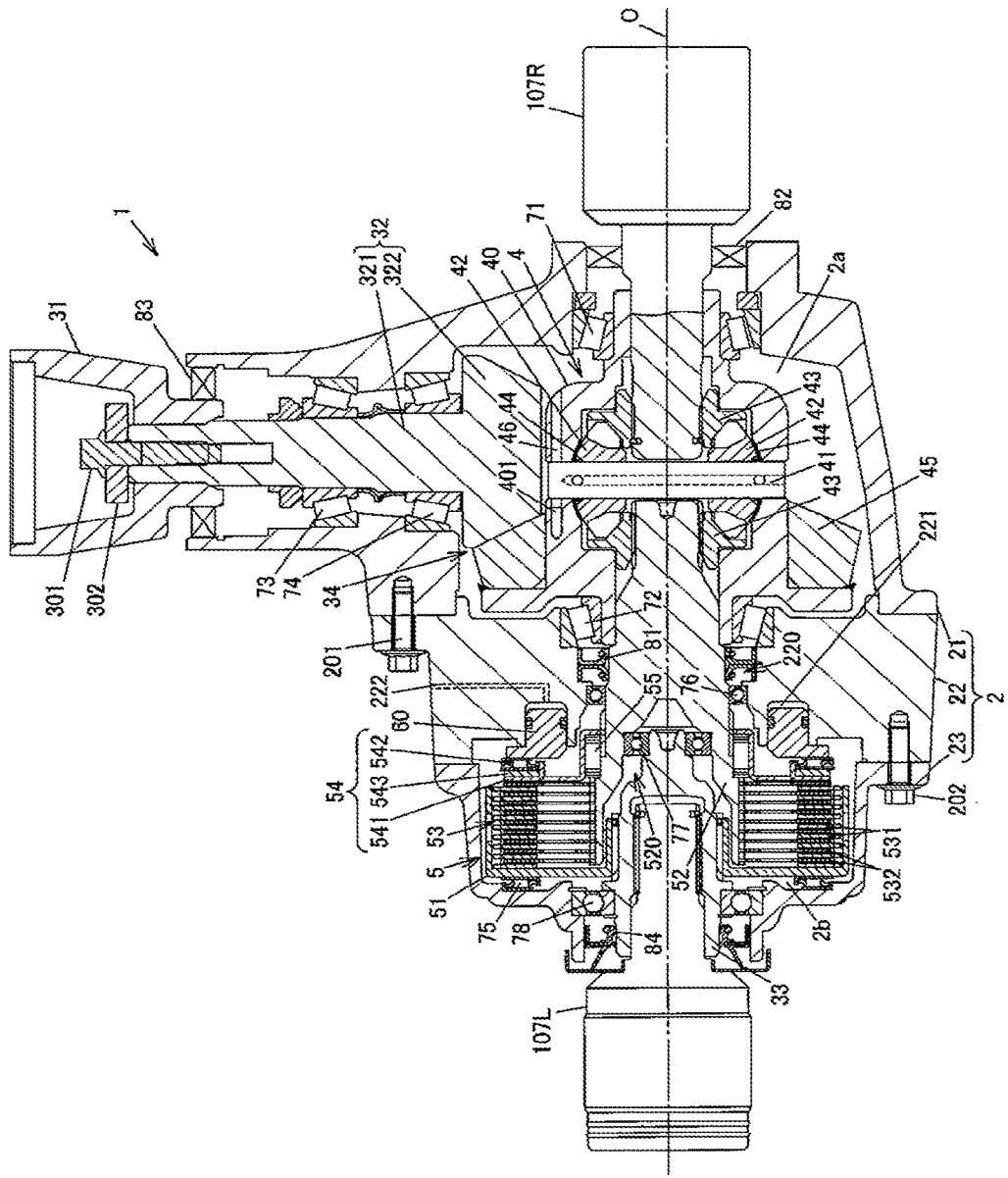
FIG. 2 is a sectional view illustrating a configuration example of the driving-force distribution device in a horizontal section.

FIG. 2 is a sectional view illustrating a configuration example of the driving-force distribution device 1 in a horizontal section.

As depicted in FIG. 2, the driving-force distribution device 1 includes: a housing 2 including first to third housing members 21 to 23; a coupling member 31 to which the propeller shaft 108 is coupled; a pinion gear shaft 32 that rotates integrally with the coupling member 31; a differential mechanism 4 that distributes driving force of the engine 102 transmitted via the propeller shaft 108 in the four-wheel-drive state to the pair of right and left rear wheels 105R and 105L in a manner to allow differential motion therebetween; a clutch mechanism 5 as a second engagement/disengagement mechanism capable of adjusting the driving force transmitted from the differential mechanism 4 to the rear wheel 105L; and a piston 60 that is operated by the pressure of hydraulic fluid supplied from the hydraulic unit 14 (depicted in FIG. 1).

The clutch mechanism 5 includes a friction clutch 53 that is pressed by the piston 60, and is disposed between the drive shaft 107L and the differential mechanism 4. The clutch mechanism 5 can cut off transmission of the driving force from the differential mechanism 4 to the rear wheel 105L with the friction clutch 53.

In the second housing member 22, an annular cylinder chamber 221 to which hydraulic fluid is supplied from the hydraulic unit 14 and a hydraulic-fluid feed hole 222 communicating with the cylinder chamber 221 are formed. The cylinder chamber 221 accommodates one end portion of the piston 60. In FIG. 2, the hydraulic-fluid feed hole 222 is indicated by dashed lines.

The differential mechanism 4 includes: a differential case 40; a pinion shaft 41 supported by the differential case 40; a plurality of pinion gears 42 and 42 supported via the pinion shaft 41; a pair of side gears 43 and 43 that mesh with the pinion gears 42 and 42 such that the gear axes of the pair of side gears extend orthogonally to those of the pinion gears; a pair of washers 44 each disposed on a side facing the gear back surface of the pinion gears 42 and 42; and a ring gear 45 that rotates integrally with the differential case 40. In the present embodiment, the pair of pinion gears 42 and 42 are each disposed on both end portions of the pinion shaft 41 in the longitudinal direction. The differential case 40, both end portions of which in the vehicle width direction are rotatably supported by tapered roller bearings 71 and 72, rotates about a rotation axis O integrally with the pinion shaft 41.

To one side gear 43 among the pair of side gears 43 and 43 of the differential mechanism 4, a coupling shaft 33 is coaxially disposed via the clutch mechanism 5, and to the other side gear 43, the drive shaft 107R is coupled so as not to be rotatable relative thereto. To the coupling shaft 33, the drive shaft 107L is coupled so as not to be rotatable relative thereto. In FIG. 2, outer races of constant-velocity joints disposed on end portions of the rear drive shafts 107R and 107L are illustrated.

The coupling member 31 and the pinion gear shaft 32 are coupled together with a bolt 301 and a washer 302. The pinion gear shaft 32 has a shaft portion 321 and a gear portion 322, and the shaft portion 321 is rotatably supported by a pair of tapered roller bearings 73 and 74. The gear portion 322 meshes with the ring gear 45 of the differential mechanism 4. The differential case 40 is coupled to the propeller shaft 108 via a gear mechanism 34 including the ring gear 45 and the gear portion 322 of the pinion gear shaft 32.

The clutch mechanism 5 is disposed between the one side gear 43 and the coupling shaft 33, and transmits driving force with the friction clutch 53 from the one side gear 43 side to the coupling shaft 33 side. In the four-wheel-drive state of the four-wheel-drive vehicle 100, when driving force transmitted from the one side gear 43 to the drive shaft 107L via the coupling shaft 33 is adjusted by the clutch mechanism 5, driving force that is equivalent to the driving force transmitted to the drive shaft 107L is transmitted also to the drive shaft 107R by the differential function of the differential mechanism 4. In this manner, the clutch mechanism 5 can adjust the driving forces for the pair of right and left rear wheels 105R and 105L.

In the two-wheel-drive state of the four-wheel-drive vehicle 100, the dog clutch 12 is decoupled, and the friction clutch 53 of the clutch mechanism 5 is released. Accordingly, to the propeller shaft 108, rotational force is not transmitted from the upstream side (the engine 102 side) of the driving-force transmission system 101 or from the downstream side (the side of rear wheels 105R and 105L), so that the rotation of the propeller shaft stops even when the four-wheel-drive vehicle 100 is traveling. Furthermore, rotation of each of the coupling member 31, the pinion gear shaft 32, and the differential case 40 stops in the same manner as the propeller shaft 108. Consequently, in the two-wheel-drive state, losses due to oil stirring resistance, for example, in the gear mechanism 109 (see FIG. 1) including the pinion gear 108a and the ring gear 108b and in the gear mechanism 34 including the ring gear 45 and the gear portion 322 of the pinion gear shaft 32 are reduced, and thus the fuel efficiency is improved.

The housing 2 includes the first housing member 21 accommodating the pinion gear shaft 32 and the differential mechanism 4, the second housing member 22 coupled to the first housing member 21 with a plurality of bolts 201, and the third housing member 23 coupled to the second housing member 22 with a plurality of bolts 202. In FIG. 2, among the bolts 201 and the bolts 202, one bolt 201 and one bolt 202 are each illustrated.

The housing 2 is partitioned into a first accommodating chamber 2a accommodating the differential mechanism 4 and a second accommodating chamber 2b accommodating the clutch mechanism 5 by a seal member 81 that is fixed to an inner surface of a shaft hole 220 formed in a central portion of the second housing member 22. The first accommodating chamber 2a is sealed and contains lubricant (gear oil) having a viscosity suitable for lubricating gears. In the differential mechanism 4, meshing between the pair of pinion gears 42 and 42 and the pair of side gears 43 and 43 is lubricated with this lubricant.

The second accommodating chamber 2b is sealed and contains lubricant (clutch oil) having a relatively low viscosity for lubricating frictional sliding between a plurality of outer clutch plates 531 and a plurality of inner clutch plates 532 that constitute the friction clutch 53 of the clutch mechanism 5. This lubricant prevents the outer clutch plates 531 and the inner clutch plates 532 from wearing or seizing.

In the first housing member 21, a seal member 82 is fitted to the inner surface of an insertion hole through which the drive shaft 107R is inserted, and a seal member 83 is fitted to the inner surface of an insertion hole through which the coupling member 31 and the pinion gear shaft 32 are inserted. In the third housing member 23, a seal member 84 is fitted to the inner surface of an insertion hole through which the coupling shaft 33 is inserted.

The clutch mechanism 5 includes: a clutch drum 51 that rotates integrally with the coupling shaft 33; an axial inner shaft 52 that rotates integrally with the one side gear 43 of the differential mechanism 4; the friction clutch 53 that transmits driving force between the clutch drum 51 and the inner shaft 52; and a pressing-force transfer mechanism 54 that transmits pressing force of the piston 60 to the friction clutch 53.

The friction clutch 53 includes the outer clutch plates 531 that rotate together with the clutch drum 51 and the inner clutch plates 532 that rotate together with the inner shaft 52. In the present embodiment, the friction clutch 53 has nine outer clutch plates 531 and nine inner clutch plates 532, and these outer clutch plates 531 and these inner clutch plates 532 are arranged alternately along the axial direction.

Each outer clutch plate 531 has, at its outer peripheral end portions, a plurality of protrusions that engage with splines formed on an inner peripheral surface of the clutch drum 51, and is coupled to the clutch drum 51 so as to be movable in the axial direction and so as not to be rotatable relative thereto. Each inner clutch plate 532 has, at its inner peripheral end portions, a plurality of protrusions that engage with splines formed on an outer peripheral surface of the inner shaft 52, and is coupled to the inner shaft 52 so as to be movable in the axial direction and so as not to be rotatable relative thereto.

The friction clutch 53 receives pressing force of the piston 60 via the pressing-force transfer mechanism 54, whereby friction force is generated between the outer clutch plates 531 and the inner clutch plates 532, and driving force is transmitted by this friction force. As the pressing force of the piston 60 increases, the friction force between the outer clutch plates 531 and the inner clutch plates 532 increases. The control device 13 adjusts the pressure of hydraulic fluid supplied from the hydraulic unit 14 to the cylinder chamber 221, thereby being able to adjust the driving force transmitted by the clutch mechanism 5. The control device 13 increases and decreases the pressure of hydraulic fluid output from the hydraulic unit 14 in accordance with the rotational speed difference between the front wheels 104R and 104L and the rear wheels 105R and 105L and the depressed amount of an accelerator pedal, for example.

The pressing-force transfer mechanism 54 includes: an annular slide member 541 that is coupled to the inner shaft 52 in the axial direction so as not to be rotatable relative thereto; a thrust needle roller bearing 542; and a shim 543 for adjusting the position of the pressing-force transfer mechanism 54 in the rotation axis O direction.

The slide member 541 is biased by a biasing member 55 in a direction apart from the friction clutch 53. The biasing member 55 is formed of an elastic body such as a spring, a first end portion thereof in the axial direction is in contact with a surface of a step portion formed on the inner shaft 52, and a second end portion thereof is in contact with an inner rib portion of the slide member 541.

Between the clutch drum 51 and an inner surface of the third housing member 23, a thrust roller bearing 75 is disposed, and this thrust roller bearing 75 restricts axial movement of the clutch drum 51. The inner shaft 52 is rotatably supported by a ball bearing 76 that is fixed to an inner surface of the shaft hole 220. In a central portion of the inner shaft 52, an accommodating hole 520 accommodating one end portion of the coupling shaft 33 is formed. The coupling shaft 33 is rotatably supported by a ball bearing 77 disposed between the coupling shaft and the inner surface of the accommodating hole 520 and by a ball bearing 78 disposed between the coupling shaft and the third housing member 23.

In the driving-force distribution device 1 structured as described above, rotation of the differential case 40 stops during traveling in the two-wheel-drive state as described above. In this case, the side gear 43 on the right side that is coupled to the drive shaft 107R rotates together with the drive shaft 107R, and the side gear 43 on the left side rotates in a direction opposite to the rotation direction of the side gear 43 on the right side due to rotation of the pair of pinion gears 42 and 42 about the pinion shaft 41. Accordingly, the inner shaft 52 coupled to the side gear 43 on the left side and the clutch drum 51 coupled to the drive shaft 107L rotate in opposite directions.

Figure 3:
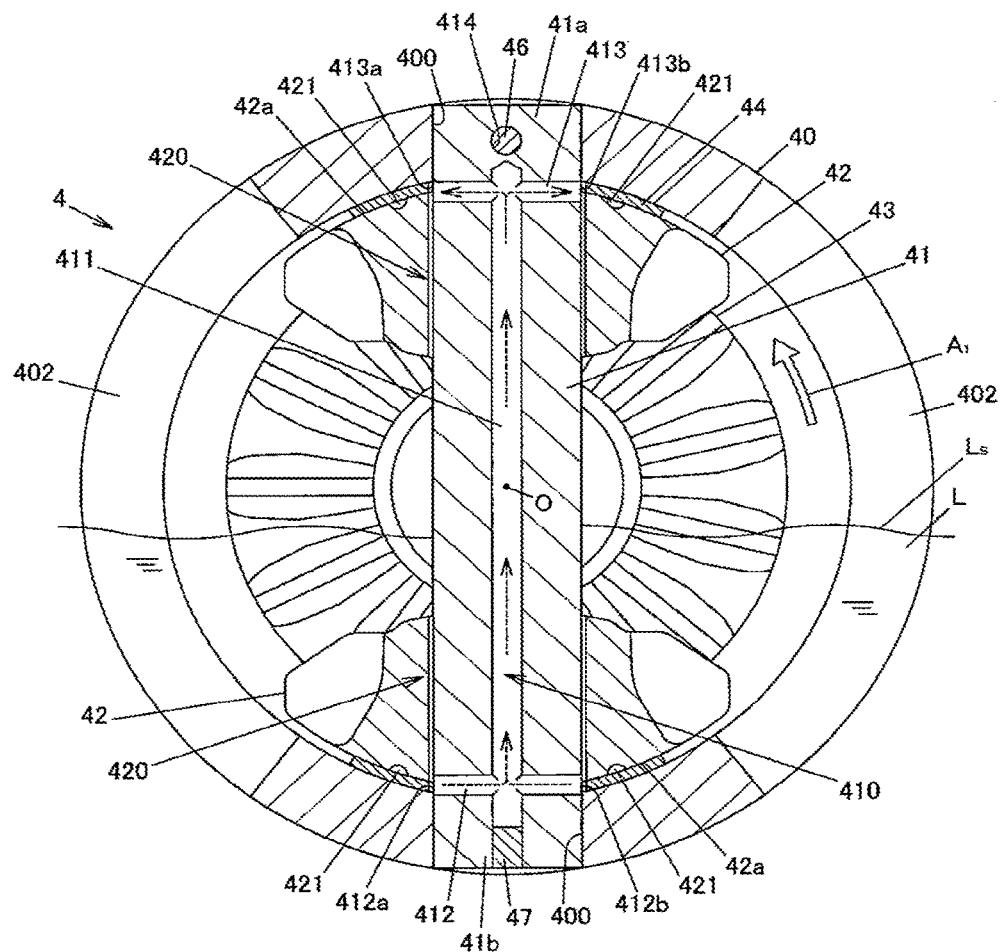
FIG. 3 is a sectional view illustrating a differential mechanism in a section orthogonal to the rotation axis thereof.
Figure 4:
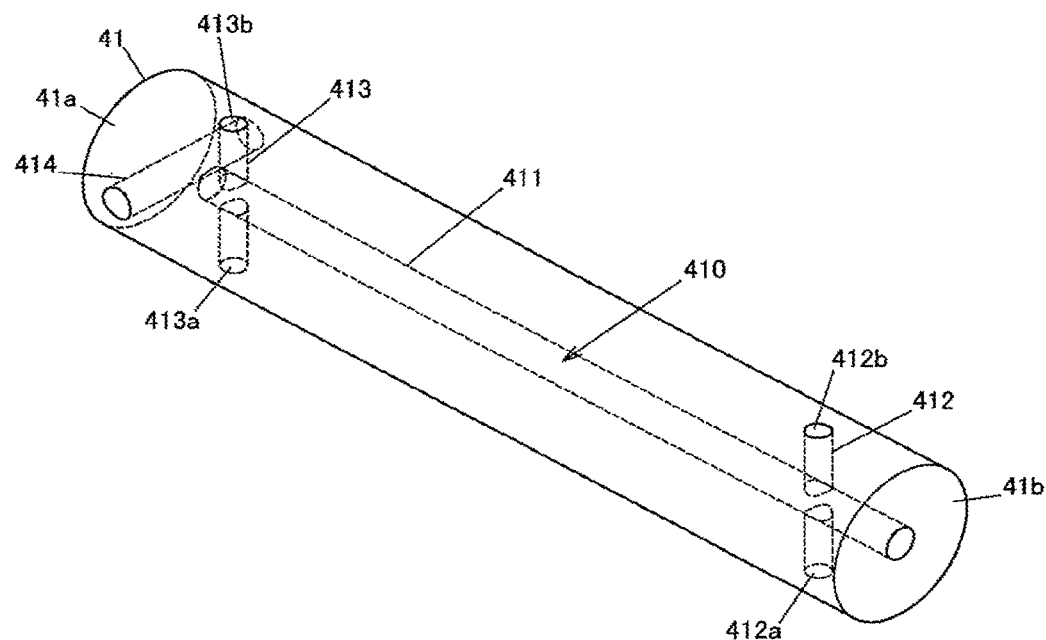
FIG. 4 is a perspective view illustrating a pinion shaft.

FIG. 3 is a sectional view illustrating the differential mechanism 4 in a section orthogonal to the rotation axis O. FIG. 4 is a perspective view illustrating the pinion shaft 41. In FIG. 3, the differential case 40 having a hollow therein, the pinion shaft 41 having a columnar shape, the pair of pinion gears 42 and 42, and the side gear 43 on the right side are illustrated in a section containing the central axis of the pinion shaft 41. FIG. 3 also illustrates a state in which the differential case 40 does not rotate with the pinion shaft 41 lying perpendicularly to the horizontal direction. In the following description, the terms "above" and "below" mean being in upper and lower positions in the vertical direction, respectively, in a state in which the driving-force distribution device 1 is mounted on the four-wheel-drive vehicle 100.

Meshing between each side gear 43 and the pinion gears 42 is lubricated with a lubricant L. In the example depicted in FIG. 3, the oil level Ls of the lubricant L is positioned below the rotation axis O.

In the two-wheel-drive mode, when the differential case 40 does not rotate, the pair of pinion gears 42 and 42 rotate in opposite directions. In a central portion of each pinion gear 42, a pinion-shaft insertion hole 420 through which the pinion shaft 41 is inserted is formed. The inner diameter of the pinion-shaft insertion hole 420 is formed to be slightly larger than the outer diameter of the pinion shaft 41.

In the differential case 40, two insertion holes 400 through which the pinion shaft 41 is inserted are formed. Each of the end portions 41a and 41b of the pinion shaft 41 in the longitudinal direction is accommodated in the corresponding insertion hole 400. In the first end portion 41a of the pinion shaft 41, a pin insertion hole 414 passing through the pinion shaft 41 in a radial direction is formed. Through this pin insertion hole 414, a pin 46 that is press-fitted into a press-fitting hole 401 (see FIG. 2) formed in the differential case 40 is disposed. This pin 46 prevents the pinion shaft 41 from coming out from and rotating relative to the differential case 40.

In the differential case 40, gear insertion holes 402 are formed inside which the pair of side gears 43 and 43 and other components are disposed when the differential mechanism 4 is assembled. The lubricant L flows into and out from the differential case 40 through these gear insertion holes 402.

In the pinion shaft 41, a flow passage 410 is formed through which the lubricant L is allowed to flow, in the two-wheel-drive mode, from the side of one pinion gear 42 positioned below among the pair of pinion gears 42 to the side of the other pinion gear 42 (the side of the pinion gear 42 positioned above the rotation axis O of the differential case 40). In the present embodiment, the flow passage 410 is formed of a first flow passage 411 formed in a central portion of the pinion shaft 41 along the longitudinal direction, a second flow passage 412 that communicates with the first flow passage 411 on the second end portion 41b side of the pinion shaft 41, and a third flow passage 413 that communicates with the first flow passage 411 on the first end portion 41a side of the pinion shaft 41. In FIG. 4, the first flow passage 411, the second flow passage 412, the third flow passage 413, and the pin insertion hole 414 inside the pinion shaft 41 are indicated by dashed lines.

The first flow passage 411 is formed of a hole that is bored from the axial end surface on the second end portion 41b side toward the first end portion 41a side of the pinion shaft 41. An opening of the first flow passage 411 on the second end portion 41b side is blocked with a stopper 47. The second flow passage 412 and the third flow passage 413 extend through the pinion shaft 41 in a radial direction, and both ends of each flow passage are open at the outer peripheral surface of the pinion shaft 41.

Sliding of the pinion gear 42 positioned above among the pair of pinion gears 42 and 42 against the pinion shaft 41 and the corresponding washer 44 is lubricated with the lubricant L that is supplied to the flow passage 410 of the pinion shaft 41 by rotation of the pinion gear 42 positioned below.

The amount of the lubricant L in the first accommodating chamber 2a of the housing 2 is set such that the height of the oil level Ls is great enough for at least part of each of both pinion gears 42 and 42 to be soaked in the lubricant L when the differential case 40 does not rotate with the pinion shaft 41 positioned horizontally. This setting allows the lubricant L in the differential case 40 to directly lubricate the pair of pinion gears 42 and 42 when the differential case 40 does not rotate with the pinion shaft 41 positioned horizontally.

Figure 5:
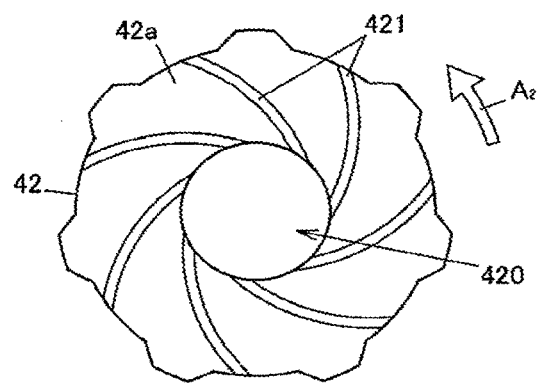
FIG. 5 is a plan view when viewed from the gear back surface side of a pinion gear.

FIG. 5 is a plan view of one of the pinion gears 42 viewed from the side of the gear back surface 42a thereof. The gear back surface 42a of each pinion gear 42 faces the corresponding washer 44. Although only the gear back surface 42a of one pinion gear 42 among the pair of pinion gears 42 is illustrated in FIG. 5, the other pinion gear 42 is structured in the same manner.

In each pinion gear 42, a plurality of back-surface oil grooves 421 configured to guide the lubricant L to the flow passage 410 of the pinion shaft 41 are formed in a manner tilted with respect to the rotation direction of the pinion gear 42. The tilted direction of each back-surface oil groove 421 is such a direction that a more anterior portion of the oil groove in the rotation direction of the pinion gear 42 when the four-wheel-drive vehicle 100 travels forward in the two-wheel-drive state (in the two-wheel-drive mode) is closer to the outer periphery of the gear back surface 42a.

In FIG. 3, the rotation direction of the side gear 43 on the right side in the two-wheel-drive mode is indicated by the arrow A1. In FIG. 5, the rotation direction of the pinion gear 42 in the two-wheel-drive mode is indicated by the arrow A2. In the present embodiment, on the gear back surface 42a of each pinion gear 42, seven back-surface oil grooves 421 are formed at regular intervals. The respective back-surface oil grooves 421 are formed from the outer peripheral end to the inner peripheral end (opening edge of the pinion-shaft insertion hole 420) of the gear back surface 42a. The back-surface oil grooves 421 are each formed in a spiral shape such that a more outer peripheral end of each oil groove on the gear back surface 42a has a smaller tilted angle with respect to the circumferential direction of the corresponding pinion gear 42.

When this pinion gear 42 rotates in the arrow A2 direction while being soaked in the lubricant L, the lubricant L around the pinion gear 42 is guided by the back-surface oil grooves 421 to flow to the central portion side (the pinion-shaft insertion hole 420 side).

Openings 412a and 412b of the second flow passage 412 and openings 413a and 413b of the third flow passage 413 in the flow passage 410 of the pinion shaft 41 are formed at positions facing the respective opening edges of the pinion-shaft insertion holes 420 of the pair of pinion gears 42 and 42 each on the corresponding gear back surface 42a side. Thus, the openings 412a, 412b, 413a, and 413b of the flow passage 410 face the inner peripheral ends of the back-surface oil grooves 421 of the pair of pinion gears 42 and 42, and the lubricant L guided by the back-surface oil grooves 421 flows from openings positioned below (the openings 412a and 412b in the example in FIG. 3) among the openings 412a and 412b of the second flow passage 412 and the openings 413a and 413b of the third flow passage 413 into the flow passage 410.

The lubricant L flowing into the flow passage 410 flows as indicated by the dashed arrows in FIG. 3, and flows out from openings positioned above (the openings 413a and 413b in the example depicted in FIG. 3) among the openings 412a and 412b of the second flow passage 412 and the openings 413a and 413b of the third flow passage 413. The lubricant flowing out from the flow passage 410 then lubricates the pinion gear 42 positioned above among the pair of pinion gears 42 and 42.

According to the first embodiment described above, even when rotation of the differential case 40 of the differential mechanism 4 stops in the two-wheel-drive mode of the four-wheel-drive vehicle 100, the lubricant L is supplied to the pinion gear 42 positioned above the rotation axis O of the differential case 40 among the pair of pinion gears 42 and 42. Consequently, wearing of the pinion gears 42, the pinion shaft 41, or the washers 44 due to insufficient lubrication can be prevented.

According to the first embodiment, the lubricant is supplied to the flow passage 410 of the pinion shaft 41 due to rotation of one pinion gear 42 positioned below the oil level Ls, and thus the lubricant L can be supplied to the other pinion gear 42 positioned above the oil level Ls without increasing the number of components or the number of man-hours for assembly.

Figure 6:
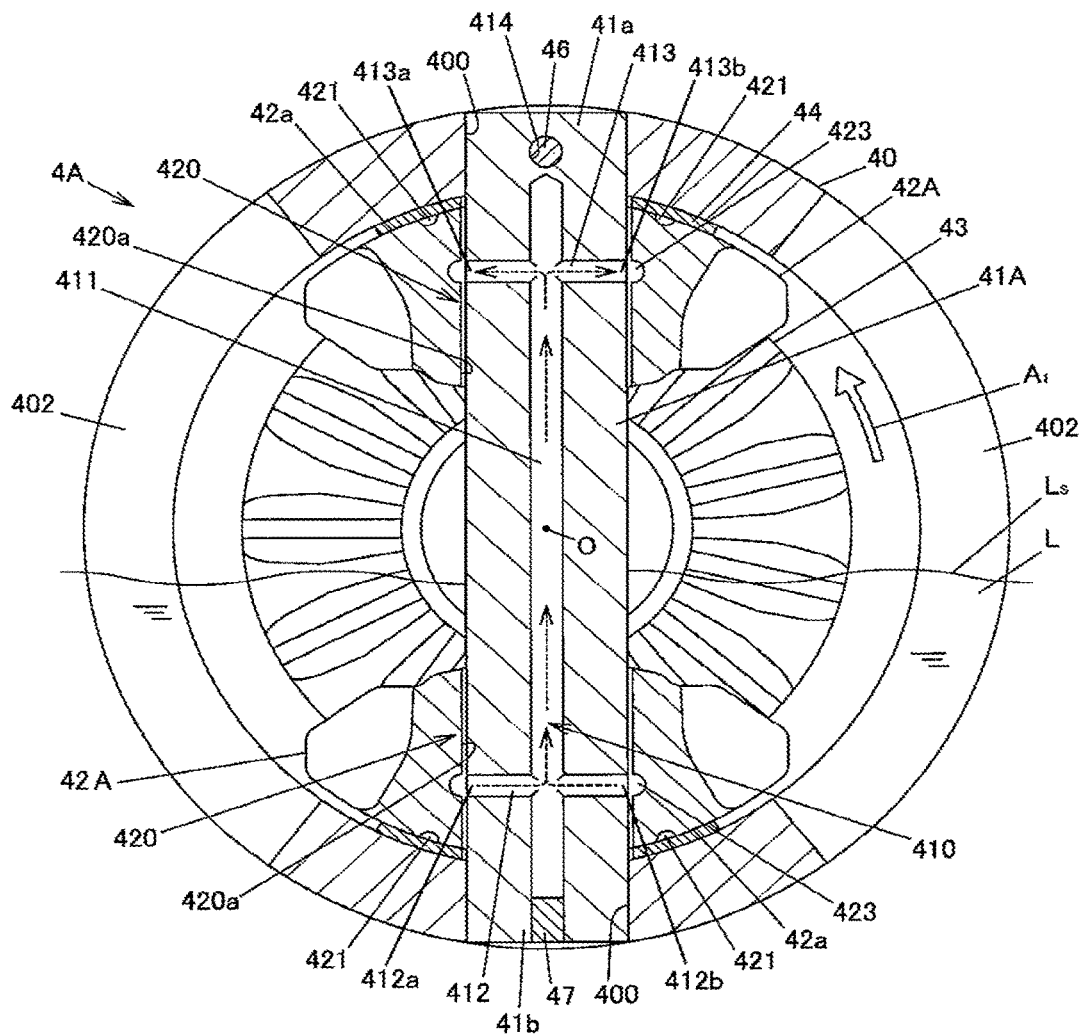
FIG. 6 is a sectional view illustrating a differential mechanism according to a second embodiment.
Figure 7:
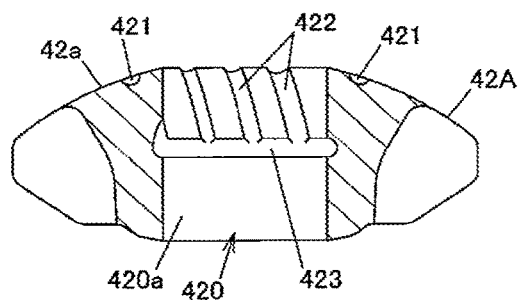
FIG. 7 is a sectional view illustrating a pinion gear according to the second embodiment.

The following describes a second embodiment of the present invention with reference to FIG. 6 and FIG. 7. The second embodiment is different from the first embodiment in the structures of a pinion shaft 41A and a pair of pinion gears 42A supported via the pinion shaft 41A.

FIG. 6 is a sectional view illustrating a differential mechanism 4A according to the second embodiment in a section orthogonal to the rotation axis O of the differential case 40. FIG. 7 is a sectional view of one of the pinion gears 42A supported via the pinion shaft 41A of the differential mechanism 4A. In FIG. 6 and FIG. 7, elements having the same functions as those described in the first embodiment are designated by the same numerals as those used in the first embodiment, and duplicate description is omitted.

In the pinion shaft 41A according to the present embodiment, the flow passage 410 is formed of the first flow passage 411, the second flow passage 412, and the third flow passage 413 in the same manner as in the pinion shaft 41 according to the first embodiment. However, positions of the openings 412a and 412b of the second flow passage 412 and the openings 413a and 413b of the third flow passage 413 are different from those in the first embodiment, and these openings 412a, 412b, 413a, and 413b face an inner peripheral surface 420a of the pinion-shaft insertion hole 420 in the pinion gear 42A.

Although each pinion gear 42 according to the first embodiment has the back-surface oil grooves 421 formed on the corresponding gear back surface 42a and has no oil grooves formed inside the corresponding pinion-shaft insertion hole 420, each pinion gear 42A according to the present embodiment has, in addition to the back-surface oil grooves 421 formed on the corresponding gear back surface 42a, a plurality of inner-peripheral-surface oil grooves 422 formed on the inner peripheral surface 420a of the corresponding pinion-shaft insertion hole 420.

In the present embodiment, the number of the inner-peripheral-surface oil grooves 422 is the same as the number of the back-surface oil grooves 421, and the back-surface oil grooves 421 communicate with the inner-peripheral-surface oil grooves 422 at an opening end portion of the pinion-shaft insertion hole 420 on the gear back surface 42a side. Herein, the number of the inner-peripheral-surface oil grooves 422 may be different from the number of the back-surface oil grooves 421, and the inner-peripheral-surface oil grooves 422 do not have to communicate with the back-surface oil grooves 421.

In each pinion gear 42A, an annular groove 423 formed along the circumferential direction is formed on the inner peripheral surface 420a of the pinion-shaft insertion hole 420. The inner-peripheral-surface oil grooves 422 communicate with the annular groove 423 at end portions thereof opposite to the gear back surface 42a side.

Each inner-peripheral-surface oil groove 422 is tilted with respect to the axial direction of the pinion gear 42A, and this tilted direction is such a direction that a more anterior portion of the oil groove in the rotation direction of the pinion gear 42A in the two-wheel-drive mode is closer to the gear back surface 42a. In the two-wheel-drive mode, this tilt allows the lubricant L to be guided by the inner-peripheral-surface oil grooves 422 to flow from the gear back surface 42a side to the annular groove 423 side.

The openings 412a, 412b, 413a, and 413b of the flow passage 410 of the pinion shaft 41A are formed at positions facing the respective annular grooves 423. By this configuration, the lubricant L flowing into the annular groove 423 via the inner-peripheral-surface oil grooves 422 flows into the flow passage 410 from openings positioned below (the openings 412a and 412b in the example in FIG. 6) among the openings 412a and 412b of the second flow passage 412 and the openings 413a and 413b of the third flow passage 413.

The lubricant L flowing into the flow passage 410 flows as indicated by the dashed arrows in FIG. 6, and flows out from openings positioned above (the openings 413a and 413b in the example depicted in FIG. 6) among the openings 412a and 412b of the second flow passage 412 and the openings 413a and 413b of the third flow passage 413. The lubricant flowing out from the flow passage 410 then lubricates the pinion gear 42A positioned above among the pair of pinion gears 42A and 42A.

In also the second embodiment described above, the same effect as in the first embodiment can be obtained. In the second embodiment, because the lubricant L is supplied between the outer peripheral surface of the pinion shaft 41A and the inner peripheral surface 420a of the pinion-shaft insertion hole 420 in each pinion gear 42A, wearing of the pinion shaft 41A due to rotation of the pinion shaft 41A can be more reliably prevented.

Figure 8:
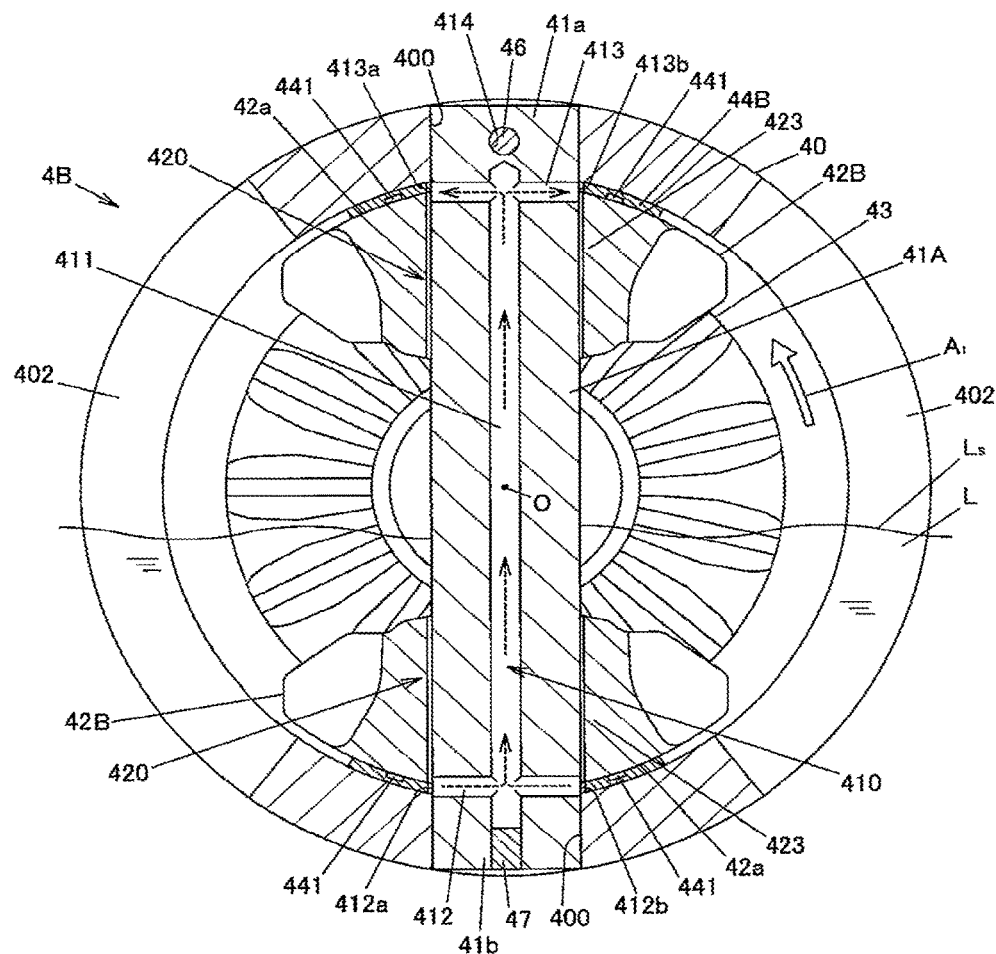
FIG. 8 is a sectional view of a differential mechanism according to a third embodiment.
Figure 9:
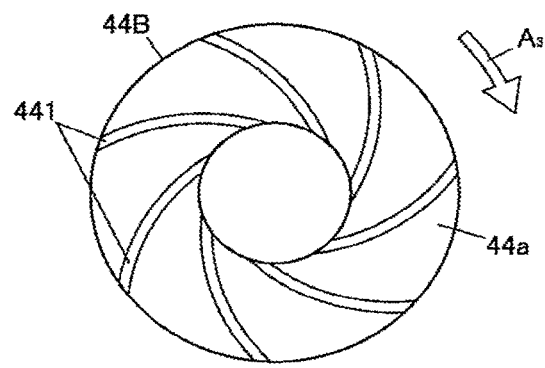
FIG. 9 is a sectional view illustrating a washer according to the third embodiment.

The following describes a third embodiment of the present invention with reference to FIG. 8 and FIG. 9. The third embodiment is different from the first embodiment in the structures of a pair of pinion gears 42B and a washer 44B that is in sliding-contact with each pinion gear 42B.

FIG. 8 is a sectional view illustrating a differential mechanism 4B according to the third embodiment in a section orthogonal to the rotation axis O of the differential case 40. FIG. 9 is a plan view illustrating the washer 44B inserted between each pinion gear 42B and the differential case 40 in the differential mechanism 4B. In FIG. 8 and FIG. 9, elements having the same functions as those described in the first embodiment are designated by the same numerals as those used in the first embodiment, and duplicate description is omitted.

Although each pinion gear 42 according to the first embodiment has the back-surface oil grooves 421 formed on the corresponding gear back surface 42a, each pinion gear 42B according to the present embodiment has no back-surface oil grooves 421 formed on the corresponding gear back surface 42a, and the gear back surface 42a has a shape of a partial spherical surface.

On the inner surface 44a of each washer 44B according to the present embodiment as a sliding-contact surface with which the gear back surface 42a of the corresponding pinion gear 42B is in sliding-contact, a plurality of inner-surface oil grooves 441 configured to guide the lubricant L to the flow passage 410 of the pinion shaft 41 in the two-wheel-drive mode are formed. This washer 44B corresponds to a "sliding-contact member" in one aspect of the present invention.

The inner-surface oil grooves 441 are formed in a manner tilted with respect to the rotation direction of the pinion gear 42B, and this tilted direction is such a direction that a more posterior portion of the oil groove in the rotation direction of the pinion gear 42B in the two-wheel-drive mode is closer to the outer periphery of the washer. In the two-wheel-drive mode, when the pinion gear 42B positioned below among the pair of pinion gears 42B and 42B rotates, this tilt allows the lubricant L to be guided by the inner-surface oil grooves 441 from the outer peripheral side to the inner peripheral side of the washer 44B. In FIG. 9, the rotation direction of the pinion gear 42 with respect to the washer 44B in the two-wheel-drive mode is indicated by the arrow A3.

The openings 412a and 412b of the second flow passage 412 and the openings 413a and 413b of the third flow passage 413 of the pinion shaft 41 are formed at positions facing the respective opening edges of the pinion-shaft insertion holes 420 of the pair of pinion gears 42B and 42B. The lubricant L flowing into the flow passage 410 flows as indicated by the dashed arrows in FIG. 8, and flows out from openings (the openings 413a and 413b in the example depicted in FIG. 8) among the openings 412a and 412b of the second flow passage 412 and the openings 413a and 413b of the third flow passage 413. The lubricant flowing out from the flow passage 410 then lubricates the pinion gear 42B positioned above among the pair of pinion gears 42B and 42B.

In also the third embodiment described above, the same effect as in the first embodiment can be obtained. In the third embodiment, the inner-surface oil grooves 441 of each washer 44B can be formed when the washer 44B is press-formed, which facilitates processing.

In the third embodiment, a case has been described in which no back-surface oil grooves 421 are formed on the gear back surface 42a of each pinion gear 42B. However, the back-surface oil grooves 421 may be formed on the gear back surface 42a. In other words, the pinion gears 42 described in the first embodiment may be used in combination with the washers 44B according to the third embodiment.

In the third embodiment, a case has been described in which the inner-surface oil grooves 441 are formed on the inner surface 44a of each washer 44B. However, the washer 44B may be eliminated and simultaneously oil grooves corresponding to the inner-surface oil grooves 441 may be formed on an inner surface of the differential case 40 facing the gear back surface 42a of the corresponding pinion gear 42B. In this case, the differential case 40 corresponds to the "sliding-contact member" of the present invention. Herein, it is preferable to perform treatment such as heat treatment for improving wear resistance on inner surfaces of the differential case 40 at portions on which these oil grooves are formed.

As can be understood by reviewing the first to the third embodiments described above, oil grooves that guide lubricant to flow passages of the pinion shaft only need to be formed on at least one surface of the gear back surface of each pinion gear and the sliding-contact surface of a sliding-contact member with which the gear back surface is in sliding-contact.

Figure 10A:
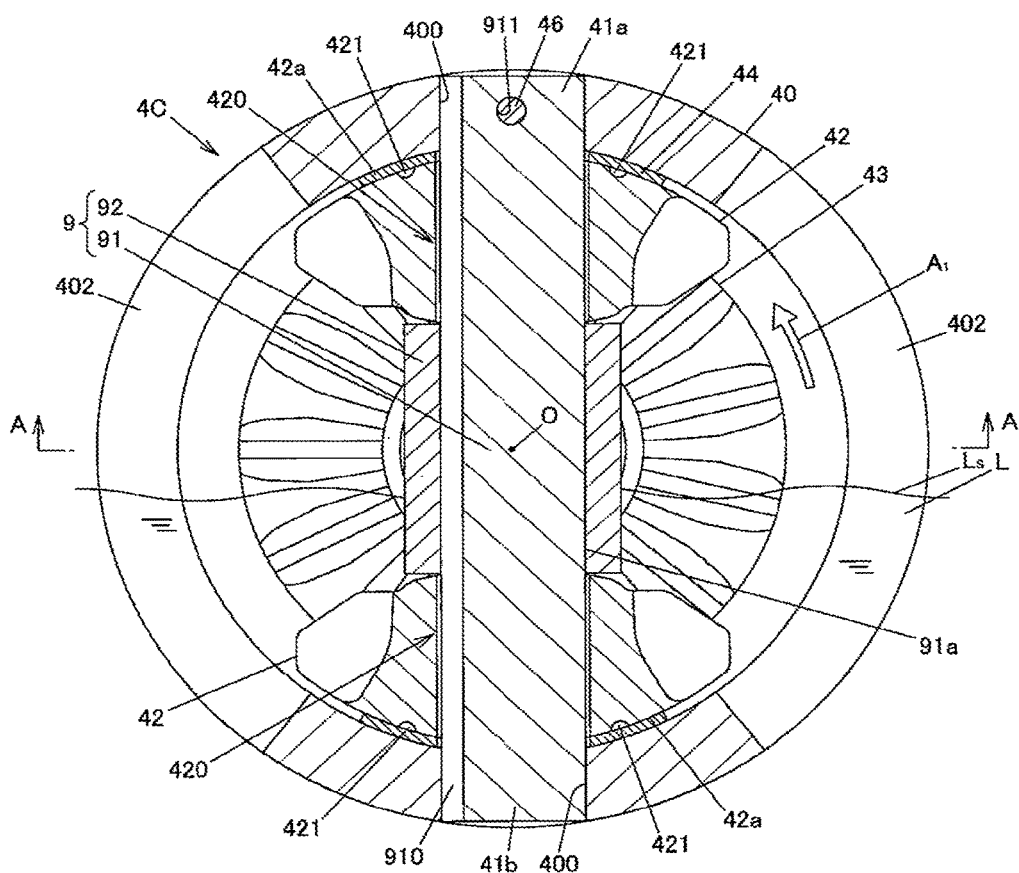
FIG. 10A is a sectional view illustrating a differential mechanism according to a fourth embodiment.
Figure 10B:
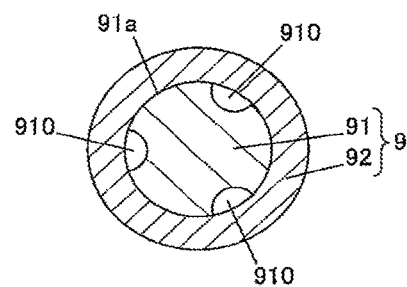
FIG. 10B is a sectional view along line A-A in FIG. 10A.

The following describes a fourth embodiment of the present invention with reference to FIGS. 10A and 10B. The fourth embodiment is different from the first embodiment in the structure of the pinion shaft 9.

FIG. 10A is a sectional view of a differential mechanism 4C according to the fourth embodiment in a section orthogonal to the rotation axis O of the differential case 40. FIG. 10B is a sectional view of FIG. 10A along line A-A. In FIG. 10A, elements having the same functions as those described in the first embodiment are designated by the same numerals as those used in the first embodiment, and duplicate description is omitted.

The pinion shaft 9 according to the present embodiment includes a shaft-shaped body portion 91 and a cylindrical cover member 92 covering part of the body portion 91. The body portion 91 is prevented by a pin 46 press-fitted into a press-fitting hole 911 from coming out from and rotating relative to the differential case 40. The cover member 92 covers part of an outer peripheral surface 91a of the body portion 91 between the pair of pinion gears 42 and 42 supported via the body portion 91. Herein, the cover member 92 may be fixed to the body portion 91, or may be movable relative to the body portion 91 in the axial direction.

On the outer peripheral surface 91a of the body portion 91, grooves extending in the axial direction are formed as flow passages 910. In FIGS. 10A and 10B, a case in which three flow passages 910 are formed in the body portion 91 is illustrated. However, the number of the flow passages 910 may be one or two, or may be four or more. The flow passages 910 are formed along the entire axial length of the body portion 91.

The lubricant L that is caused to flow into the flow passages 910 by the pinion gear 42 positioned below among the pair of pinion gears 42 and 42 flows upward to be supplied to the pinion gear 42 positioned above the oil level Ls. Leakage of the lubricant L from the flow passages 910 between the pair of pinion gears 42 and 42 is prevented by the cover member 92.

In also this fourth embodiment, the same effect as in the first embodiment can be obtained. In the fourth embodiment, the flow passages 910 are formed on the outer peripheral surface 91a of the body portion 91, which facilitates processing thereof.

The first to the fourth embodiments of the present invention have been described in the foregoing, but the present invention is not limited to these embodiments. For example, cases have been described in the first to the third embodiments in which one flow passage 410 is formed in each of the pinion shafts 41 and 41A, but the present invention is not limited to these. Alternatively, a plurality of flow passages may be formed in each pinion shaft, and some flow passages among them may be used to serve as flow passages for causing lubricant to flow from the first end portion side to the second end portion side, other flow passages may be used to serve as flow passages for causing the lubricant to flow from the second end portion side to the first end portion side. In this case, some flow passages may be open facing the opening edge of the pinion gear insertion hole of one pinion gear and the inner peripheral surface of the pinion gear insertion hole of the other pinion gear, and other flow passages may be open facing the inner peripheral surface of the pinion gear insertion hole of the one pinion gear and the opening edge of the pinion gear insertion hole of the other pinion gear. Cases have been described in the first to the fourth embodiments in which two pinion gears mesh with a pair of side gears such that the gear axes of the pinion gears extend orthogonally to those of the side gears. However, the present invention is not limited to these, and the number of the pinion gears that mesh with the pair of side gears may be three or four, or may be more than four.

The structure of the four-wheel-drive vehicle 100 is not limited to the structure illustrated in FIG. 1, and the driving-force distribution device of the present invention can be used in four-wheel-drive vehicles having various structures each including a pair of right and left main drive wheels and a pair of right and left auxiliary drive wheels. For example, a clutch mechanism capable of adjusting driving force transmitted from the engine to the propeller shaft may be provided as the first engagement/disengagement mechanism. Dog clutches may be used as the first engagement/disengagement mechanism capable of cutting off transmission of driving force from the engine to the propeller shaft and as the second engagement/disengagement mechanism capable of cutting off transmission of driving force from the differential mechanism on the side of the auxiliary drive wheels to one of the auxiliary drive wheels, and in addition to these dog clutches, a clutch mechanism capable of adjusting the transmitted driving force may be provided. In this case, the position in which the clutch mechanism is provided is not between the engine and the main drive wheels, and may be anywhere between the engine and the auxiliary drive wheels.

What is claimed is:

1. A driving-force distribution device mounted on a four-wheel-drive vehicle that includes, among a pair of front wheels and a pair of rear wheels, one pair as a pair of right and left main drive wheels and the other pair as a pair of right and left auxiliary drive wheels to which driving force is transmitted via a propeller shaft, and that switches between a two-wheel-drive state and a four-wheel-drive state by a first engagement/disengagement mechanism capable of cutting off transmission of the driving force from a driving source to the propeller shaft, the driving-force distribution device comprising:
a differential mechanism that distributes the driving force of the driving source transmitted via the propeller shaft in the four-wheel-drive state to the pair of right and left auxiliary drive wheels in a manner to allow differential motion between the right and left auxiliary drive wheels; and, a second engagement/disengagement mechanism that is disposed between either one auxiliary drive wheel among the pair of right and left auxiliary drive wheels and the differential mechanism, and that cuts off transmission of the driving force from the differential mechanism to the one auxiliary drive wheel, wherein, the differential mechanism includes: a differential case that is coupled to the propeller shaft via a gear mechanism; a pinion shaft that is supported by the differential case to rotate integrally with the differential case; a plurality of pinion gears that are supported via the pinion shaft; and a pair of side gears that mesh with the pinion gears such that gear axes of the pair of side gears extend orthogonally to gear axes of the pinion gears, and meshing between the pinion gears and the pair of side gears is lubricated with lubricant, the pinion shaft has a flow passage through which the lubricant is allowed to flow from a side of one pinion gear positioned below among the pinion gears to a side of another pinion gear in a two-wheel-drive mode in which the pair of side gears rotate in opposite directions with the differential case not rotating, the flow passage includes a first flow passage portion that extends in a direction along the axis of the pinion shaft from the side of the one pinion gear to the side of the another pinion gear, the lubricant is prevented from leakage along the first flow passage portion, and the lubricant is supplied to the flow passage by rotation of the one pinion gear positioned below.

2. The driving-force distribution device according to claim 1, wherein,
at least one of the first engagement/disengagement mechanism and the second engagement/disengagement mechanism is a clutch mechanism capable of adjusting driving force of the pair of right and left auxiliary drive wheels.

3. The driving-force distribution device according to claim 1, wherein
the first flow passage portion is a groove extending along an external surface of the pinion shaft.

4. A driving-force distribution device mounted on a four-wheel-drive vehicle that includes, among a pair of front wheels and a pair of rear wheels, one pair as a pair of right and left main drive wheels and the other pair as a pair of right and left auxiliary drive wheels to which driving force is transmitted via a propeller shaft, and that switches between a two-wheel-drive state and a four-wheel-drive state by a first engagement/disengagement mechanism capable of cutting off transmission of the driving force from a driving source to the propeller shaft, the driving-force distribution device comprising:

a differential mechanism that distributes the driving force of the driving source transmitted via the propeller shaft in the four-wheel-drive state to the pair of right and left auxiliary drive wheels in a manner to allow differential motion between the right and left auxiliary drive wheels; and, a second engagement/disengagement mechanism that is disposed between either one auxiliary drive wheel among the pair of right and left auxiliary drive wheels and the differential mechanism, and that cuts off transmission of the driving force from the differential mechanism to the one auxiliary drive wheel, wherein, the differential mechanism includes: a differential case that is coupled to the propeller shaft via a gear mechanism; a pinion shaft that is supported by the differential case to rotate integrally with the differential case; a plurality of pinion gears that are supported via the pinion shaft; and a pair of side gears that mesh with the pinion gears such that gear axes of the pair of side gears extend orthogonally to gear axes of the pinion gears, and meshing between the pinion gears and the pair of side gears is lubricated with lubricant, the pinion shaft has a flow passage through which the lubricant is allowed to flow from a side of one pinion gear positioned below among the pinion gears to a side of another pinion gear in a two-wheel-drive mode in which the pair of side gears rotate in opposite directions with the differential case not rotating, the lubricant is supplied to the flow passage by rotation of the one pinion gear positioned below, and an oil groove configured to guide the lubricant to the flow passage is formed on at least one surface of a gear back surface of each pinion gear and a sliding-contact surface of a sliding-contact member that is in sliding-contact with the gear back surface.

5. The driving-force distribution device according to claim 4, wherein,
on the gear back surface of the pinion gear, a back-surface oil groove configured to guide the lubricant to the flow passage is formed in a manner tilted with respect to a rotation direction of the pinion gear, and
a tilted direction of the back-surface oil groove is such a direction that a more anterior portion of the back-surface oil groove in the rotation direction of the pinion gear when the four-wheel-drive vehicle travels forward in the two-wheel-drive state is closer to an outer periphery of the gear back surface.

6. The driving-force distribution device according to claim 4, wherein,
on the sliding-contact surface of the sliding-contact member, a plurality of inner-surface oil grooves configured to guide the lubricant to the flow passage are formed in a manner tilted with respect to the rotation direction of the pinion gear, and
a tilted direction of each of the inner-surface oil grooves is such a direction that a more posterior portion of the inner-surface oil groove in the rotation direction of the pinion gear when the four-wheel-drive vehicle travels forward in the two-wheel-drive state is closer to an outer periphery of the sliding-contact member.

7. The driving-force distribution device according to claim 5, wherein,
the flow passage of the pinion shaft has an opening at a position facing an opening edge, on a side of the gear back surface, of a pinion-shaft insertion hole formed in each of the pinion gears.

8. A driving-force distribution device mounted on a four-wheel-drive vehicle that includes, among a pair of front wheels and a pair of rear wheels, one pair as a pair of right and left main drive wheels and the other pair as a pair of right and left auxiliary drive wheels to which driving force is transmitted via a propeller shaft, and that switches between a two-wheel-drive state and a four-wheel-drive state by a first engagement/disengagement mechanism capable of cutting off transmission of the driving force from a driving source to the propeller shaft, the driving-force distribution device comprising:

a differential mechanism that distributes the driving force of the driving source transmitted via the propeller shaft in the four-wheel-drive state to the pair of right and left auxiliary drive wheels in a manner to allow differential motion between the right and left auxiliary drive wheels; and, a second engagement/disengagement mechanism that is disposed between either one auxiliary drive wheel among the pair of right and left auxiliary drive wheels and the differential mechanism, and that cuts off transmission of the driving force from the differential mechanism to the one auxiliary drive wheel, wherein, the differential mechanism includes: a differential case that is coupled to the propeller shaft via a gear mechanism; a pinion shaft that is supported by the differential case to rotate integrally with the differential case; a plurality of pinion gears that are supported via the pinion shaft; and a pair of side gears that mesh with the pinion gears such that gear axes of the pair of side gears extend orthogonally to gear axes of the pinion gears, and meshing between the pinion gears and the pair of side gears is lubricated with lubricant, the pinion shaft has a flow passage through which the lubricant is allowed to flow from a side of one pinion gear positioned below among the pinion gears to a side of another pinion gear in a two-wheel-drive mode in which the pair of side gears rotate in opposite directions with the differential case not rotating, the flow passage includes a first flow passage portion that extends in a direction along the axis of the pinion shaft from the side of the one pinion gear to the side of the another pinion gear, the lubricant is supplied to the flow passage by rotation of the one pinion gear positioned below, the first flow passage portion is a hole through the pinion shaft, and the pinion shaft includes a second flow passage portion extending in a direction perpendicular to the axis of the pinion shaft through the pinion shaft and intersecting the first flow passage portion.

9. The driving-force distribution device according to claim 8, wherein the second flow passage portion is at the side of the one pinion gear, the pinion shaft includes a third flow passage portion extending in the direction perpendicular to the axis of the pinion shaft through the pinion shaft and intersecting the first flow passage portion, and the third flow passage portion is at the side of the another pinion gear.

* * * * *